Patented Dec. 21, 1943

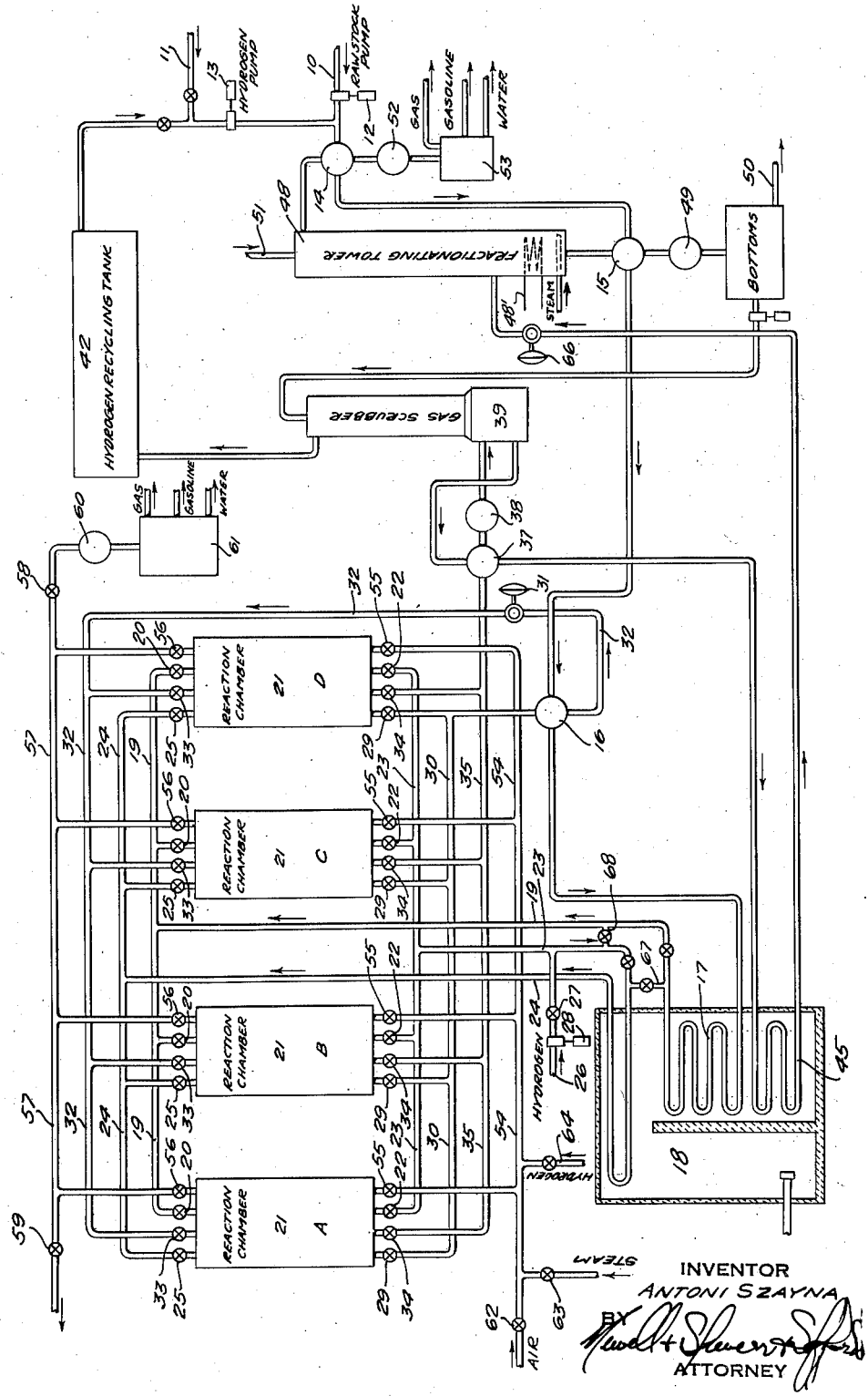

2,337,358

UNITED STATES PATENT OFFICE 2,337,358

TREATMENT OF HYDROCARBONS

Antoni Szayna, Brooklyn, N. Y., assignor to Albert C. Travis, New York, N. Y.

Application October 20, 1939, Serial No. 300,297

7 Claims. (Cl. 196—24)

This invention relates to treatment or refining of hydrocarbons in which desulfurization occurs, with or without one or more other reactions, such as, e. g., cracking, polymerization, hydrogenation, dehydrogenation, etc., and more particularly to the use and reuse of catalytically active sulfur absorbing materials for such desulfurization.

My present invention is a further development of the process described and claimed in my Patent No. 2,273,299, dated February 17, 1942. In the process described in my said prior patent I utilize for purposes of desulfurization a contact material having its catalytic activities controlled to avoid undesirable reactions such as, for instance, decomposition of the oil into hydrogen and carbon which would occur at the specified high temperatures in the presence of highly active catalytic materials, such as nickel, cobalt, iron, etc.

According to my present invention, I utilize the full activity and sulfur absorbing capacity of a catalytic sulfur-absorbing material by dividing the treatment of the oil into at least two stages, one of which occurs at high temperature with a contact material catalytically inhibited, e. g., by at least partial poisoning with sulfur in accordance with my said prior invention, and another of which takes place at such low temperatures that the full activity of the catalytic contact material may be utilized without serious danger to satisfactory operation from undesirable reactions such as, for example, decomposition of hydrocarbons into elements.

My invention may be carried out with these stages arranged in either order, and I have found that each possesses certain advantages peculiar to itself.

Thus, the oil may be passed over the contact material, advantageously together with a small amount of hydrogen and advantageously at temperatures below about 600° F.; and the temperature may then be raised above about 700° F., after which the resulting mixture, including the oil, and advantageously with addition of more hydrogen, is passed over a sulfur-absorbing contactor which has its catalytic activities so far inhibited by previous absorption of sulfur that the undesired reactions do not occur even at these high temperatures. It is an advantage of this arrangement of the process that in the initial step there might occur (depending upon the pressure, concentration of hydrogen and time of contact) limited hydrogenation by which the most reactive unsaturated compounds, such as diolefines, are saturated, thereby avoiding any tendency of these compounds to polymerize with formation of gum. Moreover, due to the relatively high activity of the contact mass during this first stage, desulfurization proceeds with considerable rapidity even at the lowest temperature although at this low temperature, not all sulfur compounds are attacked. Thus, the period of contact during the high temperature treatment may be considerably reduced with consequent reduction in the extent of reactions, such as cracking, polymerization, hydrogenation, decomposition, etc., which may occur to some extent even without catalysis at the high temperature of this latter treatment.

Proceeding in the other order, which is often advantageous, i. e., with the high temperature treatment preceding the low temperature treatment, the oil may be heated and treated with inhibited sulfur-absorbing contactor substantially in accordance with the process described in my said Patent No. 2,273,299, except that the time of contact and quantity of contactor may be reduced. The effluent from this process, after limited cooling, e. g., by passage through suitable heat exchangers, may then be passed through a highly active catalyst of the same nature except for its relative freedom from sulfur. This catalyst because of its highly active character and the low sulfur content of its surface, readily removes sulfur which may remain in the oil after the high temperature treatment. This lower temperature catalytic treatment may also complete other desired reactions. In this case also the duration of the high temperature treatment may be reduced from that which would be required for the second stage treatment, thereby limiting high temperature reactions; a relatively higher sulfur content left in the effluent after this shorter treatment at the higher temperature will then be removed or substantially reduced by the subsequent treatment at lower temperature.

In some cases it may be desirable also to utilize low temperature treatments both before and after a high temperature treatment. In such case the highly active contact material may be divided and a part used in the preliminary stage of the oil treatment before it is heated to high temperature and a part in the final stage of the oil treatment after it has again cooled below the temperature range of catalytic decomposition; or the highly active contact material may be first used in the final treatment, then transposed in the series for use in the preliminary stage of the oil treatment, or vice versa, and after that utilized in the high temperature treatment.

The proportioning of the treatment between the various stages may be by regulating the length of travel through the highly active and less active contactors respectively. If many small units are used in series this can be effected by using more or fewer units in one stage of the oil treatment than in another. When larger units are used which cannot be divided so as to give the desired proportioning, this may be controlled for example by varying the pressure of the material passed over the contactor or by varying the time of contact. It may be desirable to divide the flow of material being treated at one stage and pass it in parallel through separate contactors thus multiplying the volume at this stage, which permits of a lower velocity at the same pressure or lower pressure with the same velocity. When gasoline is being treated, ordinarily it will be desirable to have much the greater proportion of the treatment in the presence of the inhibited contactor or with a treatment in the presence of a more active catalytic sulfur absorber but with conditions controlled so as to minimize hydrogenation. Where highly saturated hydrocarbons are required, as in kerosene or Diesel fuels, it may be desirable to give a longer treatment with hydrogen in the presence of the more active catalyst at the temperatures adapted to cause hydrogenation without decomposition into elements.

The extent of hydrogenation during treatment in the presence of the highly active catalyst may also be controlled by regulating the proportion of hydrogen in the mixture being treated. Where very little hydrogenation, if any, is desired one may use little or no hydrogen in the presence of the highly active catalyst, whereas hydrogen may be added during or before the treatment at higher temperature with the inhibited contactor.

Although I prefer to carry on the high temperature stage of my process as a sulfur-absorbing operation and to regenerate the contactor before it has become so saturated with sulfur as to form hydrogen sulfide, I may also operate with formation of hydrogen sulfide in the high temperature stage and remove the hydrogen sulfide thus formed by subsequently passing the oil over a sulfur-absorbing contactor. This sulfur-absorbing contactor may be used later in the high temperature stage.

A convenient way of carrying on such a process is to utilize the highly active contactor in one or more low temperature stages with or without subsequent use at higher temperature for absorption of sulfur; and thereafter, when it has become so far saturated with sulfur that it will produce substantial quantities of hydrogen sulfide by hydrogenation or decomposition of sulfur compounds, using it to treat the oil at temperatures above about 700° F. The oil after treatment with this more or less saturated contactor passes into a chamber or chambers containing sulfur-absorbing contactor, which may be the same type of contactor but more highly active, e. g., recently regenerated. This treatment may be at high temperature if an inhibited contact mass is used or at lower temperature if a highly active contactor is used.

In any of these cases, the advantage is secured that the decomposition of refractory sulfur compounds is effected at relatively high temperatures and/or with relatively long contact by a surface-active contactor so inactive catalytically as to avoid decomposition into elements; and remaining sulfur may then be removed from the oil sufficiently quickly or at sufficiently low temperatures or both, because of the pretreatment and the high activity of the sulfur-absorbing contactor, such as metallic nickel in a pure state or even inhibited to reduce somewhat its catalytic activities, as to avoid serious decomposition during this latter stage.

In one manner of operating my invention, the contact material is utilized and reutilized in the process cyclicly, first in the low temperature treatment, then in the high temperature treatment, and then being regenerated to a state of high catalytic activity with substantially sulfur-free surface for re-utilization in the low temperature treatment.

The regeneration may be according to any of the processes used in the art of regenerating catalysts. For example, the more or less exhausted contact material may be treated with air or other oxygen bearing gas or mixture of gases at temperatures in the neighborhood of 800 to 1000° F., or even considerably higher, until the sulfur is substantially completely removed and may then be gradually cooled (e. g., to a temperature in the neighborhood of 500° F.), whereupon the contact material is reduced by hydrogen to a high state of activity and the reduced contact material then re-utilized in the process. If desired, however, other processes may be used for regeneration, e. g., electrolytic anodic oxidation or regeneration with hydrogen or water gas by direct reduction of the sulfide. With the process of the present invention, no special precautions are needed to avoid complete removal of sulfur on the contactor during regeneration.

In the accompanying drawing I have shown diagrammatically one apparatus which is designed for carrying out my invention. It is to be understood, however, that neither this apparatus nor the description of the process and of various alternatives contained in this specification is intended to be exhaustive or limiting of the invention, but, on the contrary, these are given merely for purposes of illustration and explanation in order that others may so fully understand the invention and the principles thereof and how it can be embodied in practical use that they will be enabled in accordance with this invention to modify and adapt it with various apparatus and numerous variations in the process, each as may be best adapted to the conditions and requirements of any particular use.

The figure of the drawing is a diagrammatic representation of the apparatus arranged to serve also as a flow sheet of the process.

Referring to this drawing, the raw stock, e. g., cracked distillate of high sulfur content, is supplied through the line 10 and hydrogen through a line 11, each being raised to a suitable pressure by the pumps 12 and 13 respectively. The supply of raw stock and hydrogen passes first through the heat exchangers 14, 15 and 16, and advantageously through a convection heater 17 arranged in the flue from the tube heater 18. The vaporized raw stock and hydrogen after passing through the heater 17 enters the header 19, which is connected by valved connections 20 to the reaction chambers 21, each of which is filled with a suitable mass of contact material, for example, 15% of nickel and 2% of aluminum oxide on a carrier of pumice grains, or 5% of nickel on bauxite.

The oil is passed through the first reaction chamber, e. g., A, and the treated mixture resulting from this passage leaves through the valved connection 22 and the header 23, by which it is returned to the tube heater 18 where its temperature is raised to about 800° F., or more. The oil mixture thus heated passes on into the header 24 and through the valved connection 25 into the second reaction chamber B. In this chamber the mixture, including oil and hydrogen, passes through a contact material the catalytic activities of which are so far depressed by sulfur absorbed thereon, e. g., by a previous use, that even in the high temperature treatment there is substantially no decomposition of hydrocarbons into elements, and other reactions, e. g., hydrogenation, may be thus controlled to the desired extent.

Depending upon the nature of the treatment in the chambers A and B and upon the nature of oil being treated, it may be desirable to add hydrogen and/or raw stock to the treated oil from chamber A. This may be done by means of the valved hydrogen line 26 (in which hydrogen pressure may be controlled by a valve or compressor or both), the valved connection 27, and the compressor 28.

The effluent from this second chamber passes off through the connection 29 into the header 30, and then into the heat exchanger 16, where it gives up a substantial part of its heat to the incoming flow of raw stock. In this heat exchanger the temperature of the effluent mixture is reduced to below 650° F. and the cooled mixture, with or without reduction of pressure by an automatic control valve 31, then passes back through the header 32 and the valved connection 33 into the third reaction chamber C. In this chamber the mixture meets the most active fresh contact mass in which the final desulfurization occurs. Due to the relatively low temperature, however, the oil is not damaged by contact with this catalytic material. Upon leaving this chamber C, the effluent passes off through the valved connection 34 and the header 35 to the recovery system.

This system of chambers and connections is a very flexible one permitting of connecting for flow through the chambers in any desired order. Thus, when one chamber has the sulfur-absorbing capacity of its contained contactor practically exhausted, it is cut out of the circuit by means of valves 20—22 and the others brought into their proper order in the flow by manipulation of the valves 20—22, 25—29, and 33—34 respectively.

The gas and oil recovery system shown utilizes conventional elements and is merely exemplary of numerous systems which may be used for this purpose, as will be apparent to those skilled in the art. As shown, the effluent passes through a heat exchanger 37 and advantageously through a water cooler 38 into a separator and scrubber 39 from which the residual hydrogen gas is bled off into the hydrogen storage tank 42. The condensate from the separator after passing again through the heat exchanger 37 and through the convection heater 45 is fed into the fractionating tower 48, from which the desired fraction is drawn off for storage or further treatment as may be desired, while a heavier fraction or "bottoms," after chilling by the heat exchanger 15 and advantageously a water cooler 49, is recycled to the scrubber 39 for the purpose of scrubbing hydrocarbons out of the hydrogen gas before it is drawn off from the system.

As an excess of the heavier fractions collects, it may be drawn off through the line 50; and advantageously a portion of the condensate is recirculated, e. g., by means of the connection 51 to the top of the fractionating tower. A heating coil 48' may be used as shown and/or live steam may be introduced near the bottom of the tower.

The vapors from the fractionating tower 48 pass through the heat exchanger 14 and advantageously through a water cooler 52 and into the gas separator 53 and finally to storage or stabilizer (not shown).

While three of the reaction chambers are engaged in the desulfurizing process as just described the fourth may be undergoing regeneration. Thus, for example, residual hydrocarbons may be washed out with steam; air, with or without steam, or hydrogen may then be passed through the header 54 and the valved connection 55, and the exhaust gases taken off through the valved connection 56 and the header 57 valved at 58 and 59.

During an initial steaming out treatment the valve 59 is closed, the valve 58 open and the gases are chilled in the water cooler 60 and valuable products recovered in the separator 61. The valve 58 is then closed, 59 opened and oxygen-containing gases are supplied through the valve connections 62 and 63 and the header 54. The volatile products of regeneration resulting from passing these gases through the reaction chamber pass off through the valve connection 56 and the header 57 and through the valve 59. The temperature during this reaction may be controlled by proportioning the admission of steam through the valve connection 63 with that of the air supplied through the connection 62 by a chemical effect more fully described and claimed in my copending application, Serial No. 233,983, filed October 8, 1938, but in this case the temperature will be controlled at a higher value in order to substantially completely remove the sulfur from the contact mass.

After the removal of sulfur substantially complete, hydrogen may be supplied through the same header 54 or a separate header. Valved connections 62, 63 and 64 may be provided for supplying air, steam and hydrogen for this purpose. This regeneration is more fully described and claimed in my copending applications, Serial Nos. 117,673 and 233,983, filed December 24, 1936, and October 8, 1938, respectively; but in the present case, since substantially complete removal of sulfur is desirable, it is an advantage to use undiluted air at the end of the burning-out treatment, although steam and/or a diluent may be used during the more violent stage of the regeneration reaction to protect the contactor against over-heating.

After the sulfur is removed by the treatment with air, the mass is cooled to a temperature of 800° F. or less and subjected to a treatment with hydrogen between about 800° F. and 300° F., until the catalytic sulfur-absorbing metal is substantially entirely reduced to the free metallic state.

Hydrogen gas used in the treatment of the oil may be of say 85% purity and can be introduced together with the oil into the pipe-heater or separately into the chambers or can be divided as the procedure requires, e. g., it can be introduced together with the raw stock into the low-temperature reaction chamber an amount of 150 to 600 cu. ft. of hydrogen gas per barrel of oil and then into the high temperature section, e. g., as shown at 26, an additional 200 to 500 cu. ft. or even more. The concentration of hydrogen together with other conditions, namely, temperatures, pressures, time of contact and the proper state of activity of the contactor in each chamber control the desired amount of hydrogenation, which in the case of gasoline motor fuels is generally kept low, but in the case of kerosene and gas-oils might be made very substantial.

The temperature in the active catalyst stage should be kept below about 600° F., especially with highly active catalysts, while the high temperature stage with inhibited contactor (i. e., catalytically depressed or poisoned to some degree, e. g., by previous use in the low temperature stage or by incomplete regeneration), may be operated between 700° and 1000° F., depending upon the nature of the raw-stock and the product desired. When dealing with heavy naphtha the temperature of this stage might be kept around 950° F., resulting in reforming and general treating of the raw-stock, especially where high yields of motor fuel of high octane number are desired.

Pressures are usually kept low, between 50 and 300 lbs./sq. inch, but for certain products higher pressures, sometimes even as high as 1,000 lbs./sq. inch, are desirable, especially in the high-temperature stage of the process. The pressure might be decreased in the subsequent low-temperature treatment. These variations influence not only the equilibrium of reactions (e. g., cracking, hydrogenation and polymerization) but also the time of contact and, in consequence, the rate and extent of these reactions as well as the extent of desulfurization.

I have shown the pressure in various parts of the treatment controlled by pumps 12 and 13 and by the pressure reducing automatic control valves 31 and 66. Obviously compressors, pumps and reduction valves may be used at other points in the apparatus depending upon the extent and nature of the treatment desired in each part. Bearing in mind what has been said above concerning the proportioning of the desulfurization, hydrogenation, etc., pressure conditions may be controlled in accordance with well-known principles of engineering practice.

By means of the interconnections 67 and 68 and the associated valves, the same apparatus may be used for other sequences of travel and especially for heating the oil to higher temperature before its first treatment in one or more of the chambers 21.

What I claim is:

1. The process for desulfurization of oils which comprises heating the oil to a temperature above about 700° F., decomposing sulfur compounds of the oil by passing the heated oil over a porous mass comprising nickel extended in the surface of said mass and a substantial proportion thereof being combined with sulfur distributed throughout said surface, separating the oil from said mass before the sulfur is all removed from said oil, cooling the oil to below 650° F. and removing remaining sulfur from the oil by contacting it below 650° F. with a porous mass comprising free nickel in highly active extended surface form and recovering the desulfurized oil from said mass.

2. The process for desulfurization of oils which comprises heating the oil to a temperature above about 700° F., adding hydrogen thereto, decomposing sulfur compounds of the oil by catalytic hydrogenation with formation of hydrogen sulfide by passing the heated oil over an extended-surface porous mass comprising in its surface nickel a substantial portion of which is combined with sulfur distributed throughout said surface, separating the oil from said mass before the sulfur is all removed therefrom, cooling the oil to below 650° F. and removing remaining sulfur from the oil by contacting it below 650° F. with a porous mass comprising free nickel in highly active extended surface form and recovering the desulfurized oil from said mass.

3. The process as defined in claim 1, in which the contact mass after use in the second-named contacting step of the process until substantially its entire surface is contaminated by sulfur is used in the first-named contacting step until after its sulfur absorbing capacity is substantially exhausted.

4. The process of desulfurizing hydrocarbon oils which comprises passing such oil through a highly active catalytic mass having at its surface having a metal of the class consisting of Ni, Co and Fe in extended-surface condition adapted to take up and hold sulfur from sulfur compounds in the oil, keeping the temperature below about 600° F. during said initial passage of the oil through said catalyst, thereafter heating the oil to a temperature above about 700° F. and then passing it over a contact mass having a metal of the class consisting of Ni, Co and Fe in extended surface condition adapted to take up and hold sulfur from compounds in said oil, but having its catalytic activity for decomposition of hydrocarbons into elements substantially poisoned with sulfur throughout.

5. The process of desulfurizing hydrocarbon oils which comprises passing such oil through a highly active catalytic mass having at its surface having a metal of the class consisting of Ni, Co and Fe in extended-surface condition adapted to take up and hold sulfur from sulfur compounds in the oil, keeping the temperature below about 600° F. during said initial passage of the oil through said catalyst, thereafter heating the oil to a temperature above about 700° F. and then passing it over a contact mass similar to said catalytic mass but having its catalytic activity depressed by sulfur, and before said contact mass has become saturated with sulfur to the extent that hydrogen sulfide appears in the product, segregating said contact mass from the flow of heated oil and transferring into said flow a mass previously used in the first-named low temperature treatment and the catalytic activity of which has been depressed throughout by sulfur taken up during said treatment, and adding fresh highly active catalyst to the flow of low temperature oil to make up for the mass thus transferred.

6. The process of desulfurizing hydrocarbon oils which comprises passing such oil at temperature above about 700° F. over a contact material having a metal of the class consisting of Ni, Co and Fe in extended-surface condition adapted to take up and hold sulfur from the oil, but the catalytic activity of which is so far depressed by sulfur combined with said metal throughout the contact surface that it does not substantially catalyze decomposition of the oil into carbon and hydrogen, cooling the oil below the temperature at which such decomposition would occur on the highly active catalyst hereinafter specified, passing the oil at such reduced temperature over a catalytically active contact material having a metal of the class consisting of Ni, Co and Fe in extended-surface condition adapted to take up and hold sulfur from sulfur compounds in the oil, removing the used contact material from the high temperature treatment after it has absorbed a substantial amount of sulfur, regenerating the used contact material to a highly active catalyst by removing sulfur therefrom and regenerating the extended metallic surface, reusing in the low temperature step the material thus regenerated, and subsequently reusing it in the high temperature step after it has absorbed sulfur throughout its surface in the low temperature step.

7. The process of desulfurizing oil which comprises subjecting the same in heated condition to successive treatments by passing the oil over an extended-surface contact mass selected from the group consisting of nickel, cobalt and iron, said contact mass in one treatment being highly active, and in another treatment having combined sulfur in substantially all parts thereof, the oil being heated to a temperature of above about 700° F. when the contact mass is combined with sulfur and being at a temperature below about 600° F. when the porous mass is active.

ANTONI SZAYNA.

CERTIFICATE OF CORRECTION.

Patent No. 2,337,358.  December 21, 1943.

ANTONI SZAYNA.

It is hereby certified that error appears in the printed specification of the above numbered patent requiring correction as follows: Page 1, second column, line 34, before "for" insert --except--; page 3, second column, line 40, after "sulfur" insert --is--; page 5, second column, line 11, claim 7, after "is" insert --highly--; and that the said Letters Patent should be read with this correction therein that the same may conform to the record of the case in the Patent Office.

Signed and sealed this 14th day of March, A. D. 1944.

Leslie Frazer (Seal)   Acting Commissioner of Patents.